Patented Oct. 18, 1932

1,882,701

UNITED STATES PATENT OFFICE

JOHN D. ALLEY, OF PITTSBURGH, PENNSYLVANIA, ASSIGNOR TO THE AMERICAN BRAKE SHOE AND FOUNDRY COMPANY, OF NEW YORK, N. Y., A CORPORATION OF NEW YORK

REFRACTORY COMPOSITION FOR BRAKE SHOE MOLDS

No Drawing. Application filed August 22, 1929. Serial No. 387,817.

This invention relates to refractory compositions for use in forming the walls of the cavity of a metal casting mold, and to the method of producing same.

A refractory composition suitable for use as a wall lining for the whole or parts of a mold cavity for casting brake shoes, for example, must have low thermal conductivity to prevent chilling the casting; it must be capable of resisting repeated heat shocks without cracking, spalling, or breaking down; and it must be strong and substantial to withstand the wear and tear of repeated casting operations. I have found that a composition composed largely of fused silica and with a suitable bonding material answers all of these requirements. The essential properties of fused silica which make it desirable are:—it is a vitreous material without crystalline structure, it has low thermal conductivity, and it has a low coefficient of expansion. Bonding clays are used which will vitrify at less temperature than that required to devitrify fused silica.

A typical composition which I have found satisfactory consists of 60% fused silica and 40% refractory binder. The refractory binder may consist of 50% Kentucky ball clay and 50% Georgia kaolin. The percentage of clays may vary from 15% to 50% with a corresponding change in the proportion of fused silica. I may also use a percentage of silicon carbide for a part of the fused silica, in a composition as follows: fused silica 40%, silicon carbide 20%, Kentucky ball clay 20%, and Georgia kaolin 20%.

The thermal conductivity of silicon carbide is comparatively high and it is not desirable to use more than 25% of it in substitution for fused silica.

In preparing the composition I proceed as follows:

All materials should be ground or crushed to pass through a relatively fine screen, depending upon the quality of the refractory desired. Of each material I have used approximately one-half of 20 to 80 mesh and one-half of 80 mesh and finer to provide a compact aggregate and a dense refractory with smooth face, without voids, and with enough relatively coarse aggregate to make a structurally strong body. The materials should be thoroughly mixed in a dry-pan, in a pug mill, or in any other manner. The blocks or sections or liners for lining in whole or in part the cavity of the mold may be formed from a wet mix by molding or by pressing; or they may be formed from what is commonly known as a dry mix, which contains about 7% of water, under pressure of as much as one ton or more per square inch. After the refractory shapes are formed they are thorougly dried to drive off excess moisture, and then they are heated. This heat treatment should be sufficient to vitrify the binder without devitrifying the fused silica and the temperature should be maintained until all the binder is vitrified, and followed by slow cooling depending upon the size and section of the shapes. For example, the heat treatment may be continued in a suitable furnace for a period of about four to five hours up to 2100° F., and then for about six hours at 2100° F., followed by about twelve to fifteen hours slow cooling in the furnace. It is important that the firing temperature should not be carried to a degree which would tend to devitrify the fused silica and change it into a crystalline form sensitive to heat shocks.

The shapes or blocks are made as required to form in whole or in part the walls of the mold cavity in an iron mold otherwise often referred to as a permanent mold or as a repetition mold. The refractory prevents the cast metal from chilling, it does not crack or spall or break down under the repeated heat shocks of repetition casting operations, and it is structurally strong and substantial to withstand the wear and tear of repeated casting operations.

I have given herein examples of materials and proportions and have also given firing periods and temperatures which have been found to be satisfactory in producing refractory shapes for use in iron molds for casting brake shoes, but I do not thereby limit the invention to these particular specifications because it will be apparent to those skilled in the art that they may be varied more or less to suit different conditions and to make refractories for different purposes. I have also given certain clay materials which I consider most desirable for the purpose but other materials producing the same or equivalent results may be substituted.

I claim:

1. A thermo shock resisting composition consisting of substantially 60% fused silica and 40% refractory binder, said refractory binder consisting of substantially 50% Kentucky ball clay and 50% Georgia kaolin.

2. A thermo shock resisting composition consisting of fused silica and a refractory binder consisting of Kentucky ball clay and Georgia kaolin, the fused silica being in excess of the refractory binder.

JOHN D. ALLEY.

CERTIFICATE OF CORRECTION.

Patent No. 1,882,701.   October 18, 1932.

JOHN D. ALLEY.

It is hereby certified that the state of incorporation of the assignee in the above numbered patent was erroneously described and specified as "New York", whereas said state of incorporation should have been described and specified as "Delaware", as shown by the records of assignments in this office; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.